(12) United States Patent
Chang et al.

(10) Patent No.: US 7,853,772 B2
(45) Date of Patent: Dec. 14, 2010

(54) METHOD FOR MANAGING PARTITIONS IN A STORAGE DEVICE

(75) Inventors: Robert C. Chang, Danville, CA (US); Michael Holtzman, Cupertino, CA (US); Farshid Sabet-Sharghi, Los Altos Hill, CA (US); Paul McAvoy, San Francisco, CA (US); Bahman Qawami, San Jose, CA (US)

(73) Assignee: SanDisk Corporation, Milpitas, CA (US)

(*) Notice: Subject to any disclaimer, the term of this patent is extended or adjusted under 35 U.S.C. 154(b) by 0 days.

(21) Appl. No.: 12/252,863

(22) Filed: Oct. 16, 2008

(65) Prior Publication Data

US 2009/0043984 A1 Feb. 12, 2009

Related U.S. Application Data

(63) Continuation of application No. 11/170,221, filed on Jun. 29, 2005, now Pat. No. 7,457,910.

(51) Int. Cl.
*G06F 12/00* (2006.01)

(52) U.S. Cl. .............................. 711/173; 711/E12.003; 711/103; 707/824

(58) Field of Classification Search ........................ None
See application file for complete search history.

(56) References Cited

U.S. PATENT DOCUMENTS

| | | | |
|---|---|---|---|
| 5,193,184 A | 3/1993 | Belsan et al. | |
| 5,253,344 A | 10/1993 | Bostick et al. | |
| 5,570,315 A | 10/1996 | Tanaka et al. | |
| 5,602,987 A | 2/1997 | Harari et al. | |
| 5,659,786 A | 8/1997 | George et al. | |
| 5,675,769 A * | 10/1997 | Ruff et al. ................... | 711/173 |
| 5,774,397 A | 6/1998 | Endoh et al. | |
| 5,784,702 A | 7/1998 | Greenstein et al. | |
| 6,046,935 A | 4/2000 | Takeuchi et al. | |
| RE36,989 E | 12/2000 | White | |
| 6,373,746 B1 | 4/2002 | Takeuchi et al. | |

(Continued)

FOREIGN PATENT DOCUMENTS

WO 99/57641 A1 11/1999

OTHER PUBLICATIONS

International Search Report and Written Opinion received in corresponding PCT Application No. PCT/US2006/025467 from International Searching Authority (EPO) dated Feb. 15, 2007, 9 pages.

(Continued)

*Primary Examiner*—Reginald G Bragdon
*Assistant Examiner*—Hamdy S Ahmed
(74) *Attorney, Agent, or Firm*—Toler Law Group

(57) ABSTRACT

A method for re-allocating memory partition space is provided. The method comprises determining when a first memory partition is full or has reached a threshold value, determining that a second memory partition has unused storage space that can be allocated to the first memory partition, and assigning the unused storage space from the second memory partition to the first memory partition. A memory controller embedded within the mass storage device and having an interface to an external host assigns the unused storage space from the second memory partition to the first memory partition.

19 Claims, 11 Drawing Sheets

U.S. PATENT DOCUMENTS

| | | |
|---|---|---|
| 6,426,893 B1 | 7/2002 | Conley et al. |
| 6,456,528 B1 | 9/2002 | Chen |
| 6,522,580 B2 | 2/2003 | Chen et al. |
| 6,609,187 B1 | 8/2003 | Merrell et al. |
| 6,643,188 B2 | 11/2003 | Tanaka et al. |
| 6,694,419 B1 | 2/2004 | Schnee et al. |
| 6,742,100 B1 | 5/2004 | Schnee et al. |
| 6,771,536 B2 | 8/2004 | Li et al. |
| 6,781,877 B2 | 8/2004 | Cernea et al. |
| 6,851,030 B2 | 2/2005 | Tremaine |
| 7,305,520 B2 * | 12/2007 | Voigt et al. .............. 711/112 |
| 7,496,493 B1 * | 2/2009 | Stevens .............. 703/24 |
| 2003/0061457 A1 | 3/2003 | Geiger et al. |
| 2003/0158884 A1 * | 8/2003 | Alford, Jr. .............. 709/104 |
| 2004/0139287 A1 | 7/2004 | Foster et al. |
| 2006/0020745 A1 * | 1/2006 | Conley et al. .............. 711/103 |
| 2006/0031593 A1 | 2/2006 | Sinclair |
| 2006/0106972 A1 | 5/2006 | Gorobets et al. |

OTHER PUBLICATIONS

Document dated Jul. 26, 2010, issued by the European Patent Office in European Patent Application No. 06 785 898.5, 12 pages.

\* cited by examiner

FIGURE 4A

| Partition | Field | Block Number |
|---|---|---|
| 1 | System Area | 0-5 |
| 1 | Data Area | 6-2047 |
| 2 | System Area | 2048-2053 |
| 2 | Data Area | 2054-4095 |

FIGURE 4B

| | 402 | 403 | 404 | 405 | 406 | 407 | 408 | 409 |
|---|---|---|---|---|---|---|---|---|
| | P1 System area | P1 Data block used | P1 Data block empty | P1 Data block used | P2 System area | P2 Data block used | P2 Data block empty | P2 Data block used |
| Virtual Block # (400) | 0-5 | 6-100 | 101-2000 | 2001-2047 | 2048-2053 | 2054-3000 | 3001-4000 | 4001-4095 |
| Real Logical Block # (401) | 0-5 | 6-100 | 101-2000 | 2001-2047 | 2048-2053 | 2054-3000 | 3001-4000 | 4001-4095 |

| | P1 System area | P1 Data block used | P2 System area | P2 Data block used | P1 Data block used | P2 Data block empty | P2 Data block used |
|---|---|---|---|---|---|---|---|
| | 410 | 411 | 412 | 413 | 414 | 415 | 416 |
| Virtual Block # | 0-5 | 6-2047 | 2548-2553 | 2554-3500 | 2048-2547 | 3501-4000 | 4001-4095 |
| Real Logical Block # | 0-5 | 6-2047 | 2048-2053 | 2054-3000 | 3001-3500 | 3501-4000 | 4001-4095 |

400 → Virtual Block #
401 → Real Logical Block #
400B

FIGURE 4C

| Area | Data area A of Partition (204B) | New Data Area of Partition 1 (202A) | Data area B of Partition 2 (204C) |
|---|---|---|---|
| Number of FAT entries (number of clusters) | 1000 | 500 | 500 |

FIGURE 4D

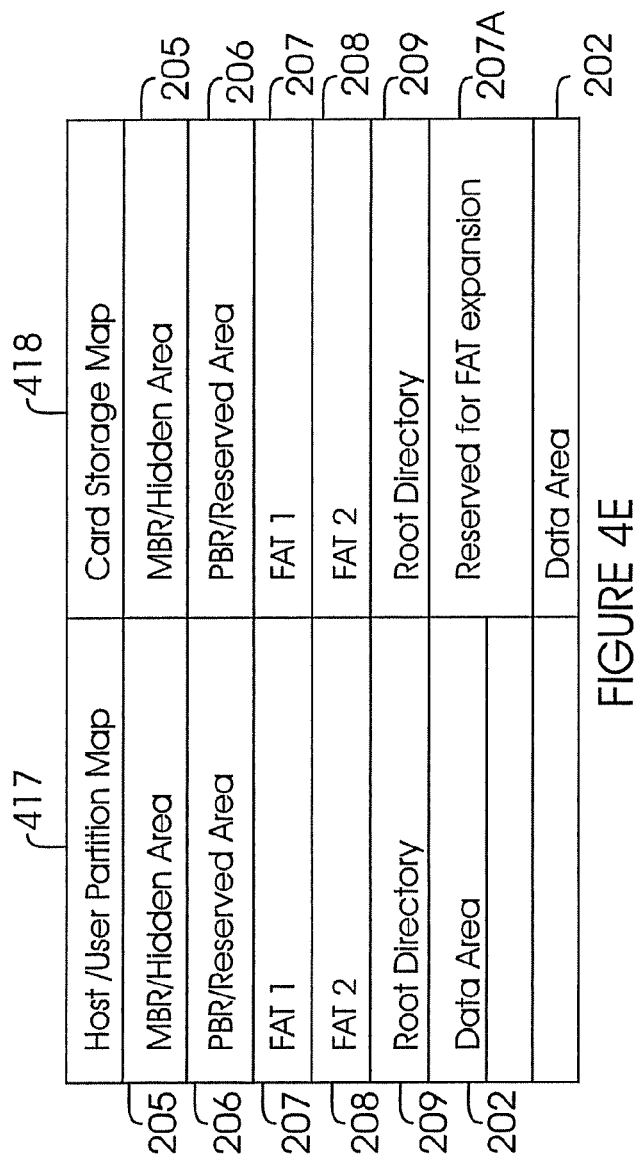

METHOD FOR MANAGING PARTITIONS IN A STORAGE DEVICE

CROSS REFERENCE TO RELATED APPLICATION

This application is a Continuation Application of and claims priority from U.S. patent application Ser. No. 11/170,221, filed on Jun. 29, 2005 and entitled "METHOD AND SYSTEM FOR MANAGING PARTITIONS IN A STORAGE DEVICE," which is incorporated herein by reference in its entirety.

FIELD OF THE DISCLOSURE

The present disclosure relates generally to memory storage devices, and more particularly, to managing partitions in storage devices.

BACKGROUND

Conventional computer systems typically include several functional components. These components may include a central processing unit (CPU), main memory, input/output ("I/O") devices, and mass storage. In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Mass storage is typically used to retain data. Generally, a program stored in mass storage is copied to main memory before being executed by the CPU. Common mass storage devices include floppy disks, hard disks, optical disks and tape drives. Additionally, flash memory may be used to provide non-volatile storage for a host system.

A host system interfaces with flash memory (also referred to as "flash device", "flash" or "flash card" interchangeably throughout this specification) via an interface. Flash memory typically includes non-volatile memory cell arrays for storing information. Flash memory systems are most commonly provided in the form of a memory card or flash drive that is removably connected with a variety of hosts such as a personal computer, a camera or the like, but may also be embedded within such host systems.

A flash memory controller typically controls the operations of a memory array. The memory controller includes a microprocessor, some non-volatile read only memory ("ROM"), a volatile random-access memory ("RAM") and one or more special circuits, for example, an error correction-code circuit ("ECC") that calculates ECC from data as it passes through the memory controller.

In an early generation of commercial flash memory systems, a rectangular array of memory cells were divided into a large number of groups of cells that each stored the amount of data of a standard disk drive sector, namely 512 bytes. An additional amount of data, such as 16 bytes, are also usually included in each group to store an error correction code (ECC) and possibly other overhead data relating to the user data and/or to the memory cell group in which it is stored. The memory cells in each such group are the minimum number of memory cells that are erasable together. That is, the erase unit is effectively the number of memory cells that store one data sector and any overhead data that is included. Examples of this type of memory system are described in U.S. Pat. Nos. 5,602,987 and 6,426,893. It is a characteristic of flash memory that the memory cells need to be erased prior to re-programming them with data.

When writing data to the flash memory via a logical interface, the host typically assigns unique logical addresses to sectors, clusters or other units of data within a continuous virtual address space of the memory system. The host typically maintains a file system and allocates file data to logical clusters, where the cluster size is typically fixed. A flash device is divided into plural logical sectors and the host allocates space within the clusters comprising of a plurality of logical sectors. A cluster is a sub-division of logical addresses and a cluster map is designated as a file allocation table ("FAT"). The FAT is normally stored on the storage device itself.

Like a disk operating system (DOS), the host writes data to, and reads data from, addresses within the logical address space of the memory system. A controller within the memory system translates logical addresses received from the host into physical addresses within the memory array, where the data are actually stored, and then keeps track of these address translations.

Typically, a memory device (for example, flash memory) is partitioned by the host system. Normally two partitions share a drive and each partition size is set by the host system. If one partition gets full and the other partition has more space left at any given time, it is useful to re-allocate the amount of space assigned to each partition. In conventional systems, the host performs this function by re-formatting the drive. This process involves copying all the data from the drive before reformatting and then re-allocating space to each partition. This process is tedious and time consuming, and hence undesirable.

Therefore, there is a need for a method and system that efficiently manages partitions for optimum usage of memory storage space.

SUMMARY

In one aspect of the present disclosure, a mass storage memory system is provided. The system includes re-programmable non-volatile memory cells. The memory cells are arranged in a plurality of blocks of memory cells that are erasable together and that are connected together in a plurality of series strings to define rows of memory cells for storing data. The memory cells are divided into at least two memory partitions and each memory partition has a system area and a data area. The system includes a controller including a microprocessor that is adapted to receive data via a logical interface from a host system. The controller re-allocates memory space to a first memory partition that is either full or has reached a threshold value from a second memory partition that has unused storage space by using a mapping table. The mapping table uses a virtual block address for the system area and the data area such that the system area and the data area appear contiguous to the host system. A real logical block address maps the virtual block address to an actual logical block address.

In another aspect of the present disclosure, the mass storage memory system includes a controller with a microprocessor that is adapted to receive data via a logical interface from a host system, a first memory partition with a system area and a data area, and a second memory partition with a system area and a data area. The controller re-allocates memory space from the second memory partition that has unused storage space to the first memory partition that is either full or has reached a threshold value by using a virtual block address for the system area and the data area, such that the system area and the data area appear contiguous to the host system.

In yet another aspect, a method for dynamically re-allocating data storage space between a first memory partition having a system area and a data area and a second memory partition having a system area and a data area is provided. The method includes determining when the first memory partition is full and/or has reached a threshold value, determining that the second memory partition has empty or unused storage space that can be allocated to the first memory partition that is full and/or has reached a threshold value, and assigning some unused space from the second memory partition to the first memory partition, wherein a memory controller assigns the unused space.

In yet another aspect, a method is provided that comprises receiving data from an external host device via a logical interface at a memory controller embedded within a mass storage device that includes non-volatile memory cells. The mass storage device comprises a first memory partition and a second memory partition. The method further comprises re-allocating memory storage space from the first memory partition to the second memory partition by using a mapping table, wherein the mapping table includes a logical block address and a virtual block address for each of the first memory partition and the second memory partition. The memory storage space re-allocated from the first memory partition to the second memory partition appears contiguous to the external host device.

In yet another aspect, a method is provided that comprises receiving data at a memory controller from a host device, the memory controller embedded within a mass storage device including a first memory partition and a second memory partition. The first memory partition comprises a first set of non-volatile memory cells and the second memory partition comprises a second set of non-volatile memory cells. The method further comprises re-allocating memory storage space from the first memory partition to the second memory partition by using a mapping table. The mapping table comprises a logical block address and a virtual block address for each of the first memory partition and the second memory partition. The memory storage space re-allocated from the first memory partition to the second memory partition appears contiguous to the host device. The virtual block address and the logical block address of the first memory storage partition are the same before the memory storage space is re-allocated from the first memory partition to the second memory partition and the virtual block address and the logical block address of the first memory partition are different after the memory storage space is re-allocated from the first memory partition to the second memory partition.

This brief summary has been provided so that the nature of the disclosure may be understood quickly. A more complete understanding of the disclosure can be obtained by reference to the following detailed description of the illustrated embodiments thereof in connection with the attached drawings.

BRIEF DESCRIPTION OF THE DRAWINGS

The foregoing features and other features of the present disclosure will now be described with reference to the drawings of at least one illustrative embodiment. In the drawings, the same components have the same reference numerals. The illustrated embodiment is intended to illustrate, but not to limit the disclosure. The drawings include the following Figures:

FIGS. 4A-4F shows an example of memory partition re-allocation, according to one aspect of the present disclosure.

DETAILED DESCRIPTION

To facilitate an understanding of the illustrated embodiments, the general architecture and operation of a host system/flash device will be described. The specific architecture and operation of the embodiments will then be described with reference to the general architecture. Whatever the format of the unique address, a system like system 10 may employ static addresses, dynamic addresses, or combinations thereof. In addition, the uniqueness of an address may describe true uniqueness—in that a given device is the only device with that address or effective uniqueness. An effectively unique address may not be truly unique but may provide sufficient uniqueness to identify a given device.

Figure 1A:
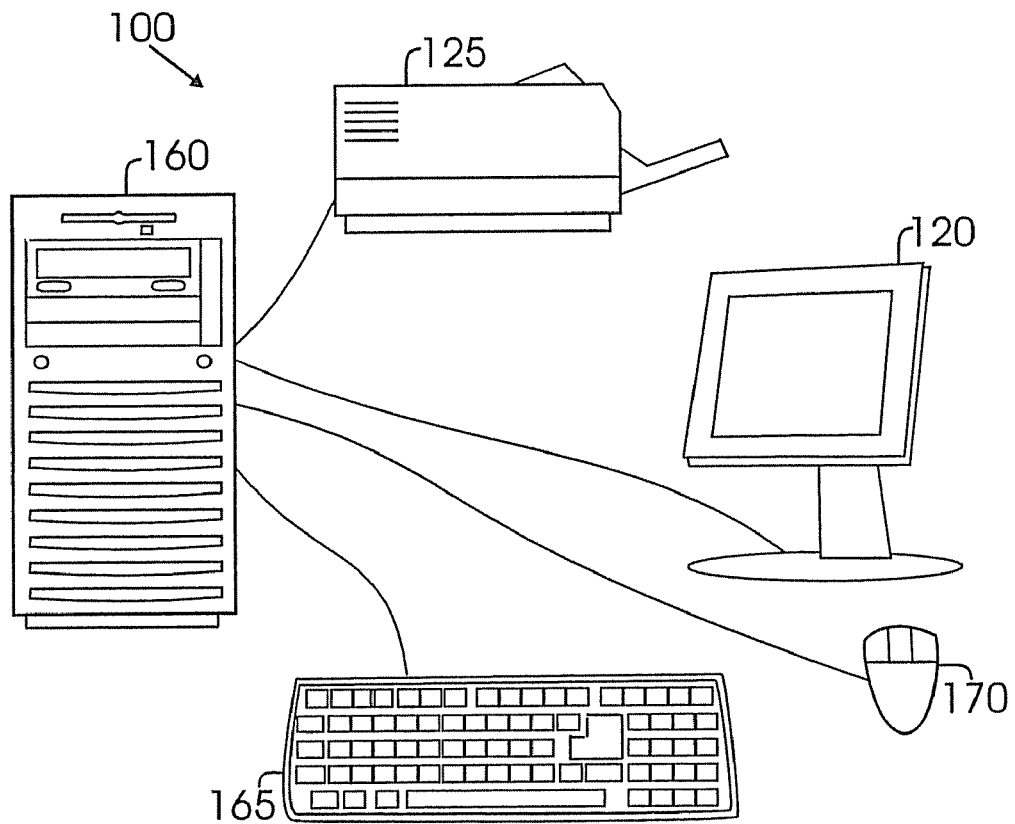
FIG. 1A shows a block diagram of a host system using a flash device.

Host System:

FIG. 1A shows a general-purpose computer system (host system) 100 that can utilize the present disclosure. Components of system 100 include a computer 160, various input/output ("I/O") devices such as a mouse 170, keyboard 165, monitor 120 and printer 125. In some embodiments, mediation server 14 may have a zoned information store including a first collection of connection information for a first plurality of callable devices associated with managed network 20 and a second collection of connection information for a second plurality of callable devices associated with managed network 22. As depicted in FIG. 1, the first collection may be located in information store 16 and the second collection may be located in information store 48. Though depicted as separate hardware components, zoning may be accomplished in software as well.

Figure 1B:
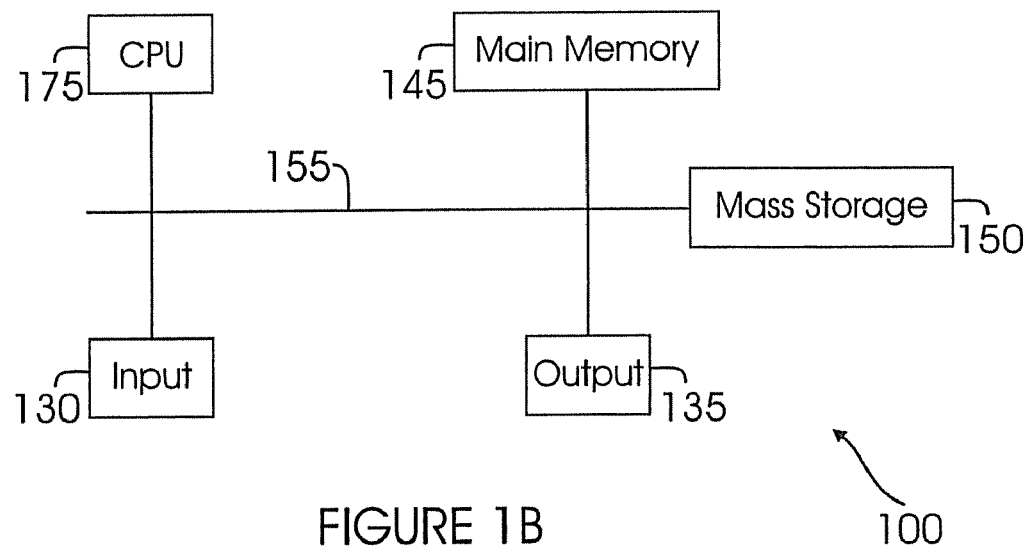
FIG. 1B shows the architecture of the host system of FIG. 1A.

FIG. 1B shows an abstracted representation of computer system 100. Component 130 is intended to represent plural input devices, such as a mouse and keyboard that allow a user to interact with the computer system 100. Similarly, output 135 represents one or more output devices, for example, monitor 120 and printer 125.

Computer system 100 includes a central processing unit ("CPU") (or microprocessor) 175 connected to a system bus 155. Main memory 145 (for example, Random access main memory ("RAM")) is also coupled to system bus 155 and provides CPU 175 with access to memory storage. When executing program instructions, CPU 175 stores those process steps in RAM 145 and executes the stored process steps out of RAM 145.

Read only memory ("ROM") (not shown) is provided to store invariant instruction sequences such as start-up instruction sequences or basic Input/output operating system (BIOS) sequences.

Mass storage device 150 allows computer system 100 to permanently store data. Mass storage device 150 may be a flash memory device, a hard disk or another type of media storage device. The description of the adaptive aspects of the present disclosure below is based on a flash memory device but is applicable to other types of memory devices. Mass storage device 150 is also referenced as flash device 150.

There are currently many different flash devices (or flash memory cards) that are commercially available, examples being the CompactFlash (CF), the MultiMediaCard (MMC), Secure Digital (SD), miniSD, Memory Stick, SmartMedia and TransFlash cards. Although each of these cards has a unique mechanical and/or electrical interface according to its standardized specifications, the flash memory included in each is very similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

The non-volatile memory cards and flash drives identified above are commercially available with data storage capacity of 512 megabytes (MB), 1 gigabyte (GB), 2 GB and 4 GB, and may go higher.

Host systems that use such memory cards and flash drives are many and varied. They include personal computers (PCs), laptop and other portable computers, cellular telephones, personal digital assistants (PDAs), digital still cameras, digital movie cameras and portable audio players. The host typically includes a built-in receptacle for one or more types of memory cards or flash drives but some require adapters into which a memory card is plugged.

A NAND architecture of the memory cell arrays is currently preferred, although other architectures, such as NOR, can also be used instead. Examples of NAND flash memories and their operation as part of a memory system may be had by reference to U.S. Pat. Nos. 5,570,315, 5,774,397, 6,046,935, 6,373,746, 6,456,528, 6,522,580, 6,771,536 and 6,781,877 and U.S. patent application publication No. 2003/0147278.

Figure 1C:
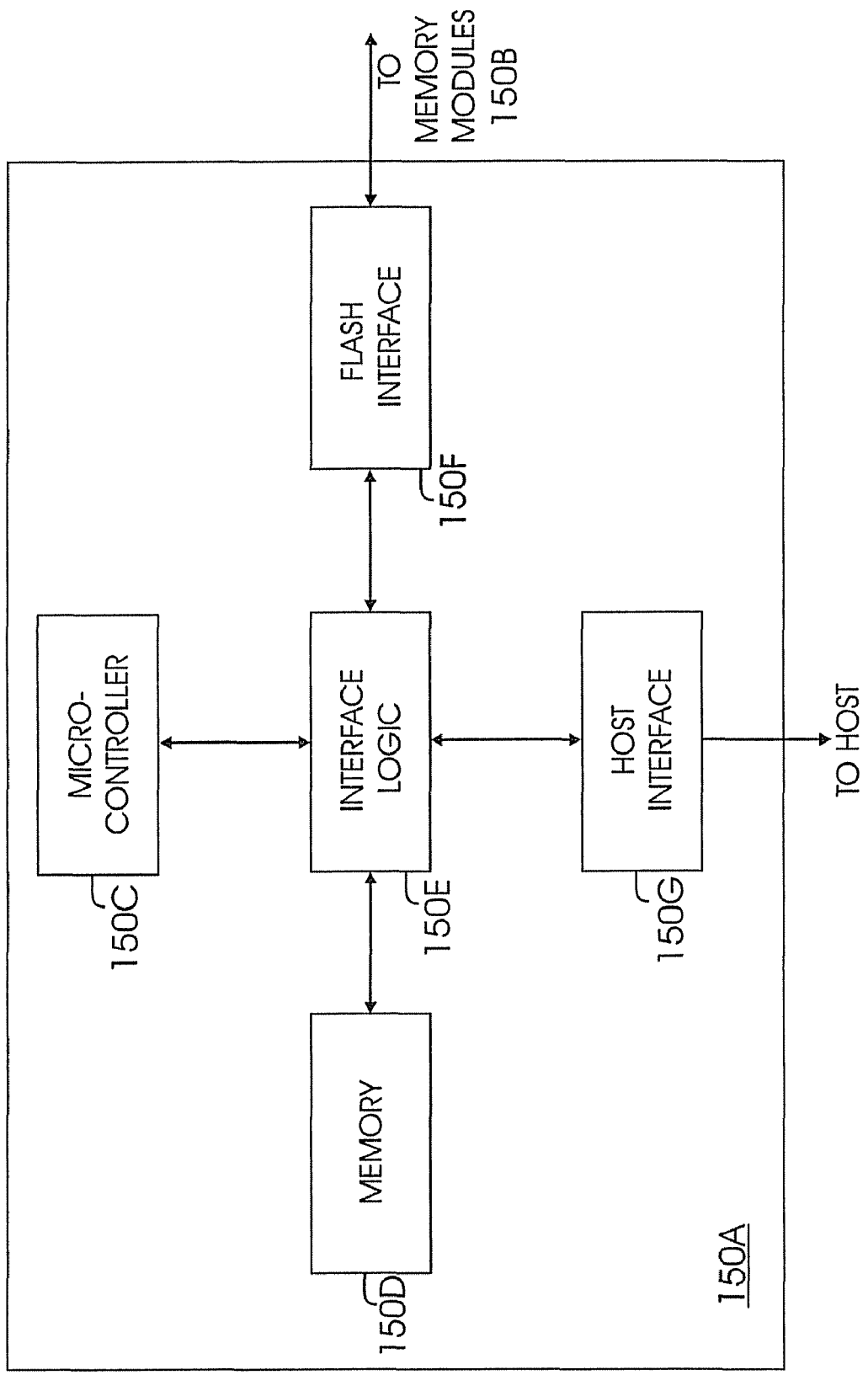
FIG. 1C shows a block diagram of a memory controller of a flash device, used according to one aspect of the present disclosure.

Flash device 150 includes a memory controller module (may also be referred to as "memory system controller" or "memory controller" or "controller") and solid-state memory modules. FIG. 1C shows a block diagram of the internal architecture of controller module 150A. Controller 150A interfaces with host system 100 via a logical interface or another peripheral bus (not shown) or via system bus 155. Controller module 150A includes a microcontroller 150C that interfaces with various other components via interface logic 150E. Memory 150D stores firmware and software instructions that are used by microcontroller 150C to control the operation of flash device 150. Memory 150D may be volatile re-programmable random access memory ("RAM"), a non-volatile memory that is not re-programmable ("ROM"), a one-time programmable memory or a re-programmable flash electrically-erasable and programmable read-only memory ("EEPROM").

A host interface 150G interfaces with host system 100, while a flash interface 150F interfaces with memory modules 150B.

Figure 1D:
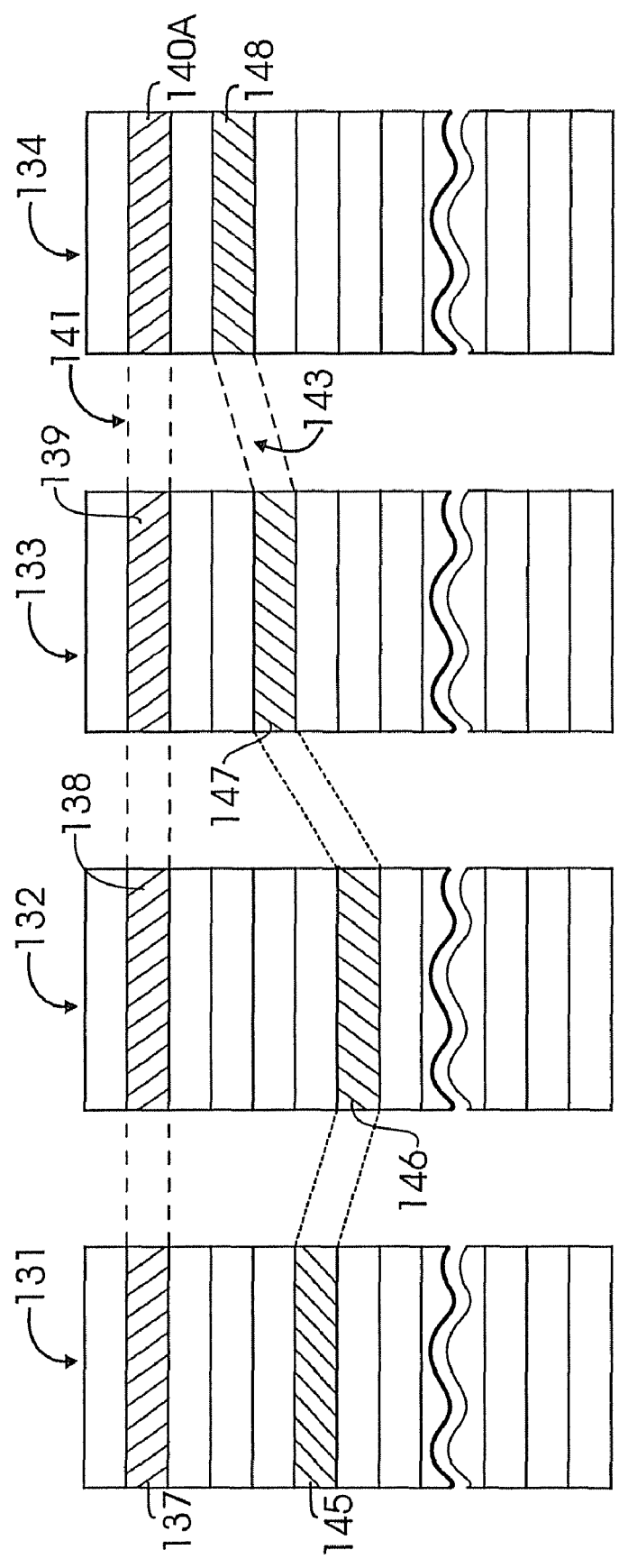
FIG. 1D shows an example physical memory organization for a flash memory system.

FIG. 1D conceptually illustrates an organization of the flash memory cell array (150B) that is used as an example in further descriptions below. Four planes or sub-arrays 131-134 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into blocks of memory cells shown in FIG. 1D by rectangles, such as blocks 137, 138, 139 and 140A, located in respective planes 131-134. There can be dozens or hundreds of blocks in each plane.

A block of memory cells is the unit of erase, the smallest number of memory cells that are physically erasable together. For increased parallelism, however, the blocks are operated in larger metablock units. One block from each plane is logically linked together to form a metablock. The four blocks 137-140A are shown to form one metablock 141. All of the cells within a metablock are typically erased together. The blocks used to form a metablock need not be restricted to the same relative locations within their respective planes, as is shown in a second metablock 143 made up of blocks 145-148.

Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 1E:
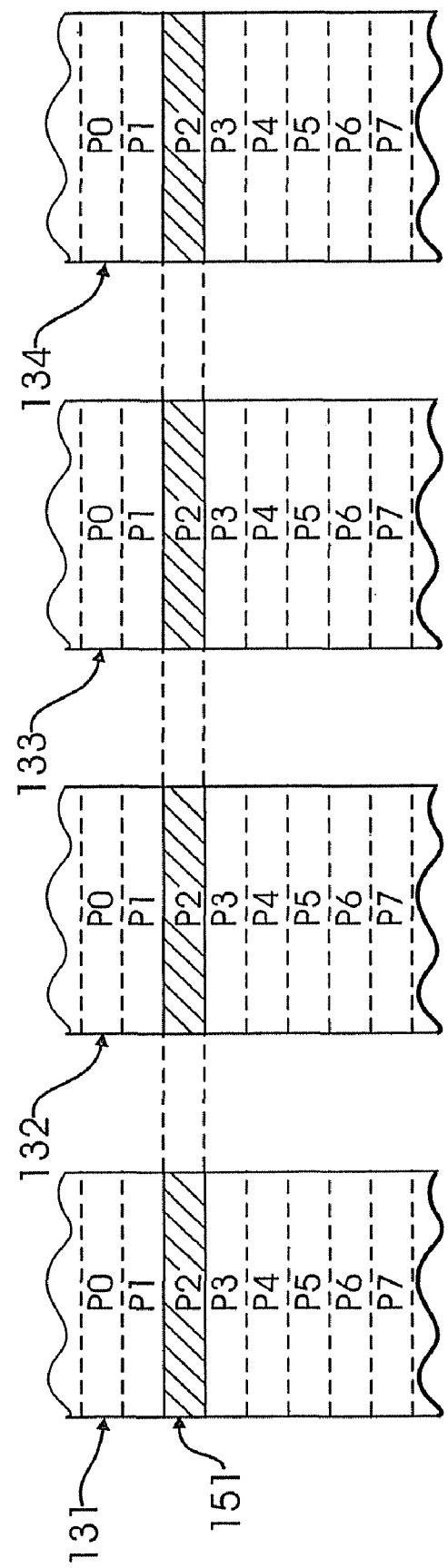
FIG. 1E shows an expanded view of a portion of the physical memory of FIG. 1D.

The individual blocks are in turn divided for operational purposes into pages of memory cells, as illustrated in FIG. 1E. The memory cells of each of the blocks 131-134, for example, are each divided into eight pages P0-P7. Alternatively, there may be 16, 32 or more pages of memory cells within each block. The page is the unit of data programming and reading within a block, containing the minimum amount of data that are programmed at one time.

In the NAND architecture, a page is formed of memory cells along a word line within a block. However, in order to increase the memory system operational parallelism, such pages within two or more blocks may be logically linked into metapages. A metapage 151 is illustrated in FIG. 1E; being formed of one physical page from each of the four blocks 131-134. The metapage 151, for example, includes the page P2 in of each of the four blocks but the pages of a metapage need not necessarily have the same relative position within each of the blocks.

Figure 1F:
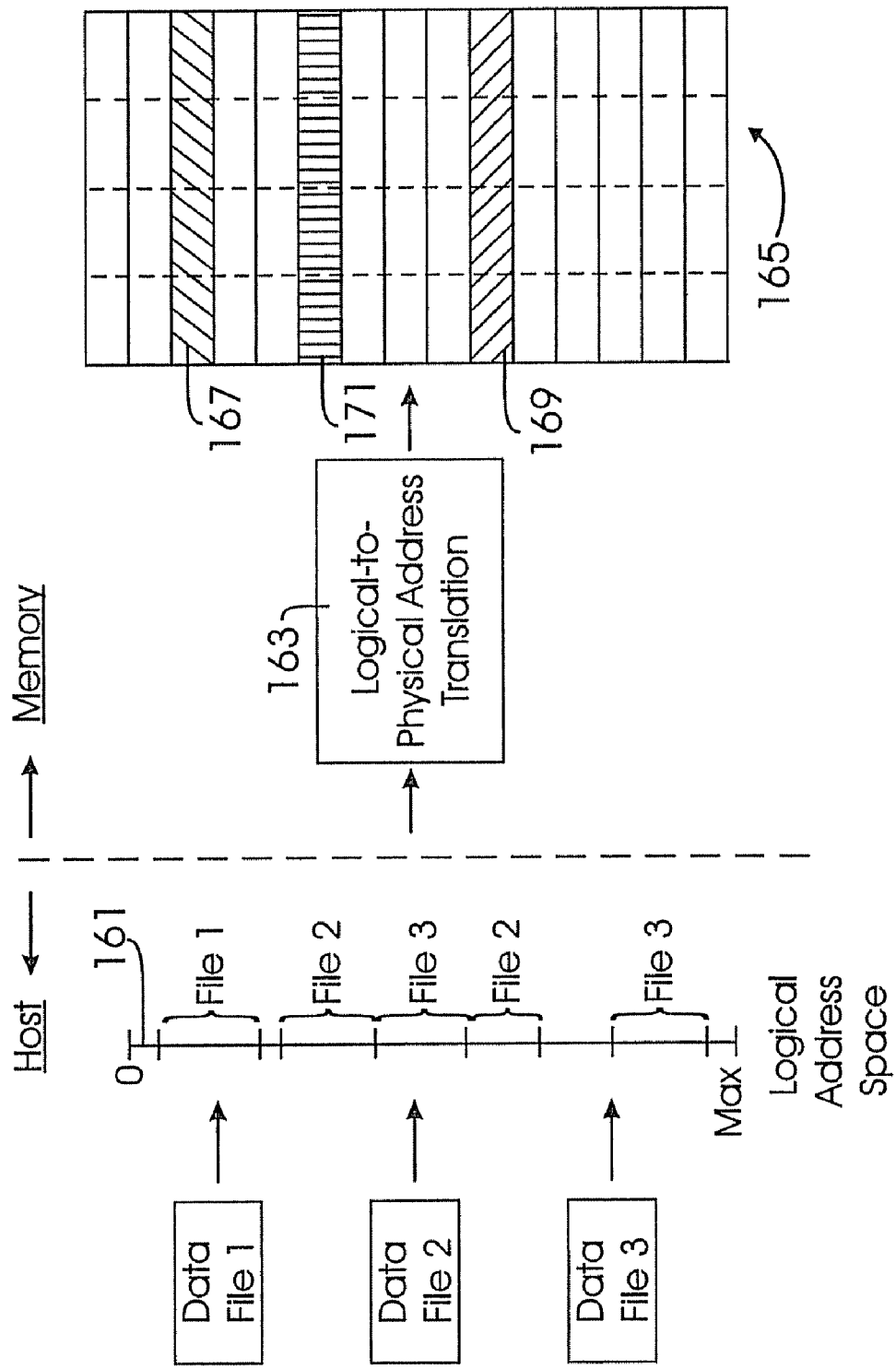
FIG. 1F shows a conventional logical address interface between a host and a re-programmable memory system.

FIG. 1F illustrates the use of a logical interface between a host and a mass memory system. The host deals with data files generated or used by application software or firmware programs executed by the host. A word processing data file is an example, and a drawing file of computer aided design (CAD) software is another, found mainly in general computer hosts such as PCs, laptop computers and the like. A document in the PDF format is also such a file. A still digital video camera generates a data file for each picture that is stored on a memory card. A cellular telephone utilizes data from files on an internal memory card, such as a telephone directory. A PDA stores and uses several different files, such as an address file, a calendar file, and the like. In any such application, the memory card may also contain software that operates the host.

A continuous logical address space 161 is large enough to provide addresses for all the data that may be stored in the memory system. The host address space is typically divided into increments of clusters of data. Each cluster may be designed in a given host system to contain a number of sectors of data, somewhere between 4 and 64 sectors being typical. A standard sector contains 512 bytes of data.

Three Data Files 1, 2 and 3 are shown in the example of FIG. 1F to have been created. An application program running on the host system creates each file as an ordered set of data and identifies it by a unique name or other reference. Enough available logical address space not already allocated to other files is assigned by the host to File 1. File 1 is shown to have been assigned a contiguous range of available logical addresses. Ranges of addresses are also commonly allocated for specific purposes, such as a particular range for the host operating software, which are then avoided for storing data even if these addresses have not been utilized at the time the host is assigning logical addresses to the data.

When a File 2 is later created by the host, the host similarly assigns two different ranges of contiguous addresses within the logical address space 161, as shown in FIG. 1F. A file need not be assigned contiguous logical addresses but rather can be fragments of addresses in between address ranges already allocated to other files. This example then shows that yet another File 3 created by the host is allocated other portions of the host address space not previously allocated to the Files 1 and 2 and other data.

The host keeps track of the memory logical address space by maintaining a file allocation table (FAT), where the logical addresses the host assigns to the various host files are maintained. The FAT table is typically stored in the non-volatile memory, as well as in a host memory, and is frequently updated by the host as new files are stored, other files deleted, files modified and the like. When a host file is deleted, for example, the host then de-allocates the logical addresses previously allocated to the deleted file by updating the FAT table to show that they are now available for use with other data files.

The host is not concerned about the physical locations where the memory system controller chooses to store the files. The typical host only knows its logical address space and the logical addresses that it has allocated to its various files. The memory system, on the other hand, through a typical host/card interface, only knows the portions of the logical address space to which data have been written but does not know the logical addresses allocated to specific host files, or even the number of host files. The memory system controller 150A converts the logical addresses provided by the host for the storage or retrieval of data into unique physical addresses within the flash memory cell array where host data are stored. A block 163 represents a working table of these logical-to-physical address conversions, which is maintained by the memory system controller 150A.

The memory system controller 150A is programmed to store data files within the blocks and metablocks of a memory array 165 in a manner to maintain the performance of the system at a high level. Four planes or sub-arrays are used in this illustration. Data are preferably programmed and read with the maximum degree of parallelism that the system allows, across an entire metablock formed of a block from each of the planes. At least one metablock 167 is usually allocated as a reserved block for storing operating firmware and data used by the memory controller. Another metablock 169, or multiple metablocks, may be allocated for storage of host operating software, the host FAT table and the like. Most of the physical storage space remains for the storage of data files.

The memory system controller 150A does not know, however, how the data received has been allocated by the host among its various file objects. All the memory controller 150A typically knows from interacting with the host is that data written by the host to specific logical addresses are stored in corresponding physical addresses as maintained by the controller's logical-to-physical address table 163.

In a typical memory system, a few extra blocks of storage capacity are provided than are necessary to store the amount of data within the address space 161. One or more of these extra blocks may be provided as redundant blocks for substitution for other blocks that may become defective during the lifetime of the memory. The logical grouping of blocks contained within individual metablocks may usually be changed for various reasons, including the substitution of a redundant block for a defective block originally assigned to the metablock. One or more additional blocks, such as metablock 171, are typically maintained in an erased block pool.

When the host writes data to the memory system, the controller 150A converts the logical addresses assigned by the host to physical addresses within a metablock in the erased block pool. Other metablocks not being used to store data within the logical address space 161 are then erased and designated as erased pool blocks for use during a subsequent data write operation.

Figure 2A:
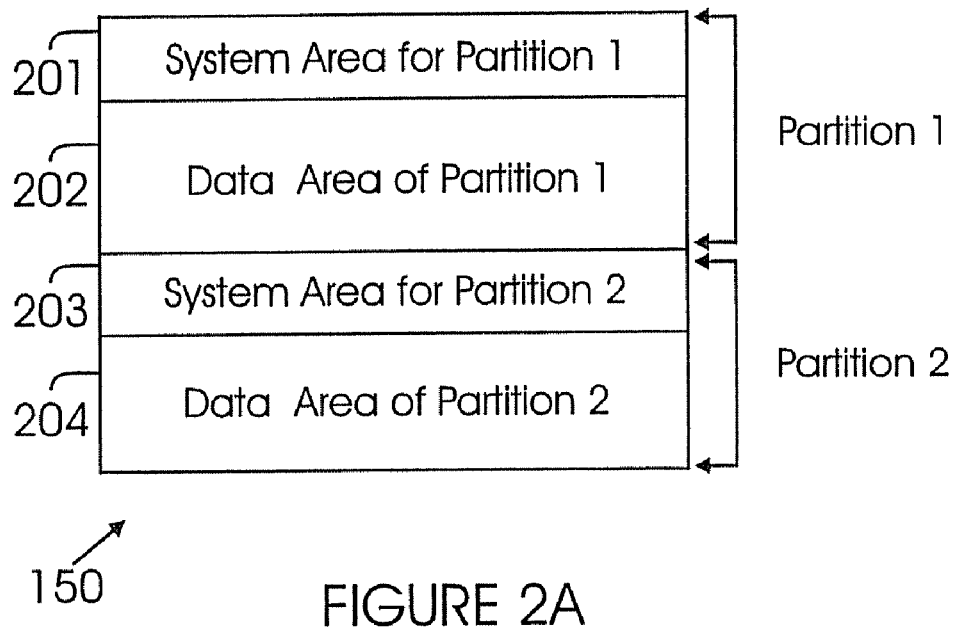
FIG. 2A shows a block diagram illustrating two memory partitions in a storage device.

Memory Partitions:

FIG. 2A shows an example of how memory storage device 150 is typically partitioned. Storage device 150 includes two Partitions, Partition 1 and Partition 2. Partition 1 includes a system area 201 and a data area 202. Partition 2 also has its own system area 203 and data area 204. Although only two partitions are shown in FIG. 2A and the re-allocation techniques below are based on this example, the adaptive aspects of the present disclosure are not limited to any particular number of memory partitions.

Figure 2B:
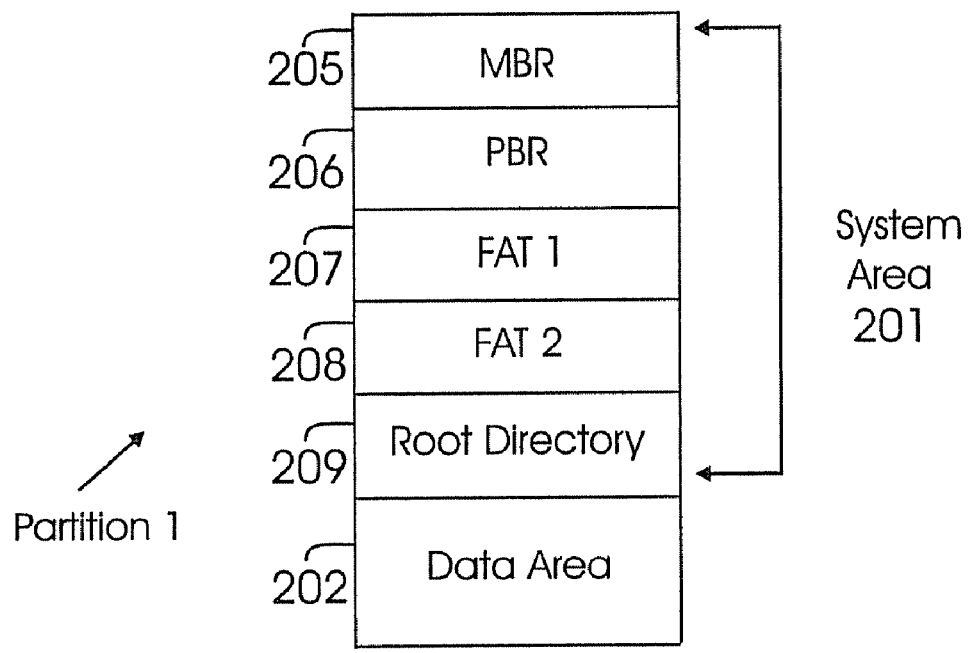
FIG. 2B shows a block diagram for a system area layout for a partition shown in FIG. 2A.

FIG. 2B shows a block diagram for Partition 1, which is similar to Partition 2. As shown in FIG. 2B, system area 201 has various segments, for example, the master boot record ("MBR") area 205, partition boot record ("PBR") area 206, FAT 1 area 207, FAT 2 area 208 and root directory area 209.

MBR area 205 stores overall partition information, and if the media is a bootable device, then MBR 205 includes instructions to jump from MBR area 205 to PBR area 206. MBR area 205 also includes hidden area, which is reserved space between MBR area 205 and PBR area 206.

PBR area 206 includes partition/boot information for a partition (in this example, Partition 1). For example, PBR area 206 includes information for the type of FAT (for example, 12/16/32 bits); a label (i.e. name of the drive), size of the drive; cluster size (i.e. the number of sectors per allocation unit); number of FAT areas (2 FAT areas FAT 1 and FAT 2 shown in FIG. 2B) and the number of sectors per FAT.

FAT areas (207 and 208) contain cluster information for each file. For example, for FAT 12, each entry in areas 207 and 208 contains 12 bits and there are a total of 4096 entries. Cluster 0 and 1 are reserved for 0.times.FFFFF8 (for media type) and End of Cluster. A particular cluster (for example, cluster 4087) is used to indicate bad clusters. For a FAT 16, each entry contains 16 bits and for FAT 32, each entry contains 32 bits.

Root directory 209 contains entries for each file. Each directory entry includes a certain number of bytes for file name or directory (for example, 8 bytes); a number of bytes for extension (for example, 3 bytes), a number of bytes (for example, 1 byte) for file attributes (for example, if a file is read only, hidden, system file, volume label, directory or modified); a number of bytes indicating the time and date when a file was created; a certain number of bytes (for example 2) for a starting cluster; and a certain number of bytes (for example 4) indicating the file length.

The number of bytes for the starting cluster points to the first cluster in FAT and the last cluster may be indicated by 0.times.FFF, 0.times.FFFF or 0.times.ffffff.

In order to write a file name in the directory, the host system finds free cluster space in FAT 1 area 207 and data is written in data area 202. Both FAT 1 and FAT 2 entries are then updated. The directory entry i.e., the date/time/starting cluster/file length is also updated.

In one aspect of the present disclosure, memory controller 150A reallocates partition space when one partition becomes full or reaches a certain threshold value and the other partition has empty space. Thus one partition increases in size, while the other decreases. The threshold value can be programmed by memory controller 150A. A mapping scheme (referred to herein as a "virtual map") is used to track cluster usage in both the partitions, as described below. This entire process is performed efficiently by memory controller 150A. The host system does not have to copy all the data and reformat the storage device.

Figure 2C:
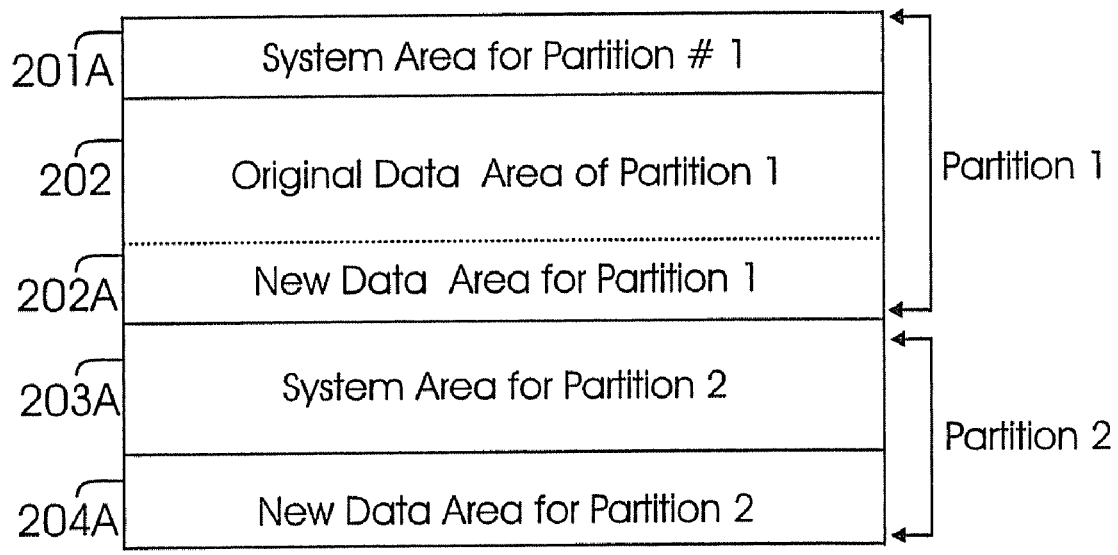
FIG. 2C shows a host system's view of re-allocated memory partitions, according to one aspect of the present disclosure; combined call may involve the creation of a derived voice channel, a VoIP call, an instant messenger (IM) connection, some other technique, or a combination thereof.

FIG. 2C shows the layout of the re-allocated Partition 1 and Partition 2, as it appears to a host system. The system area 201A of Partition 1 includes updated cluster and partition information after the re-allocation. The original partition area 202 is either full or has reached a threshold size where no more data is written there. The new data area 202A is allocated to Partition 1 from Partition 2. The reduced Partition 2 has a system area 203A and a new reduced data area 204A. The process for re-allocating the partitions will now be described in detail.

Figure 2D:
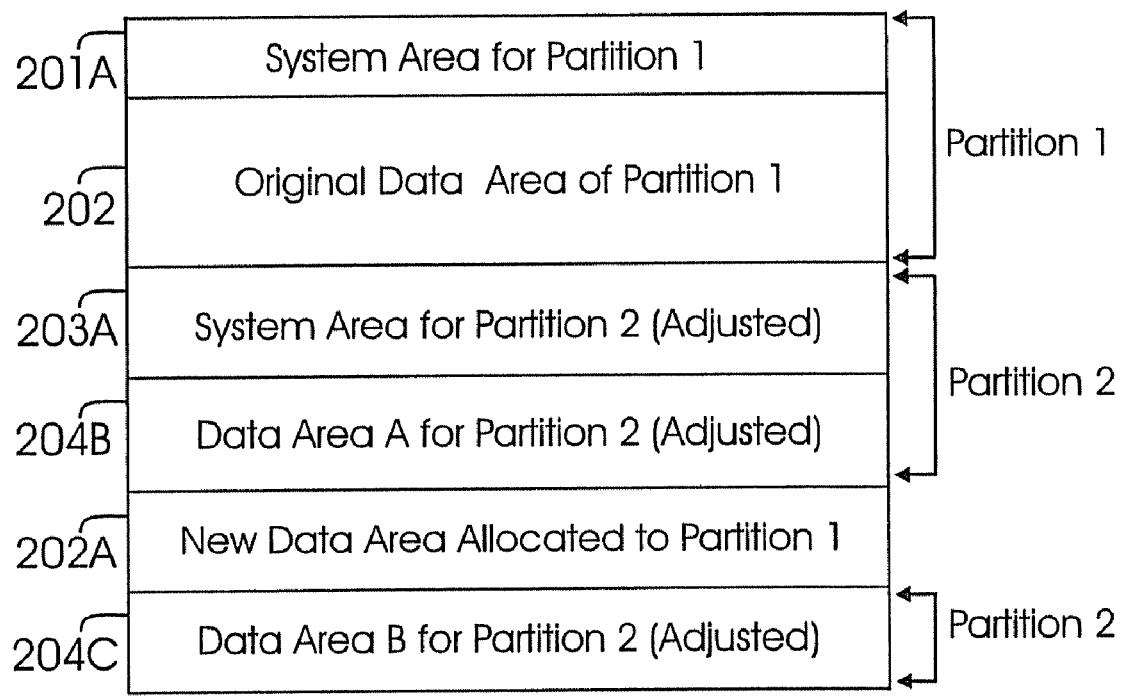
FIG. 2D shows an actual layout of re-allocated memory partitions, according to one aspect of the present disclosure.

FIG. 2D shows the actual layout of Partition 1 and 2 after a re-allocation has been performed by memory controller 150A. Partition 2 system area 203A is the adjusted area after area 202A is allocated to partition A. Partition 2 has data areas shown as 204B and 204C that are equal to data area 204A, as shown in FIG. 2C.

Figure 3:
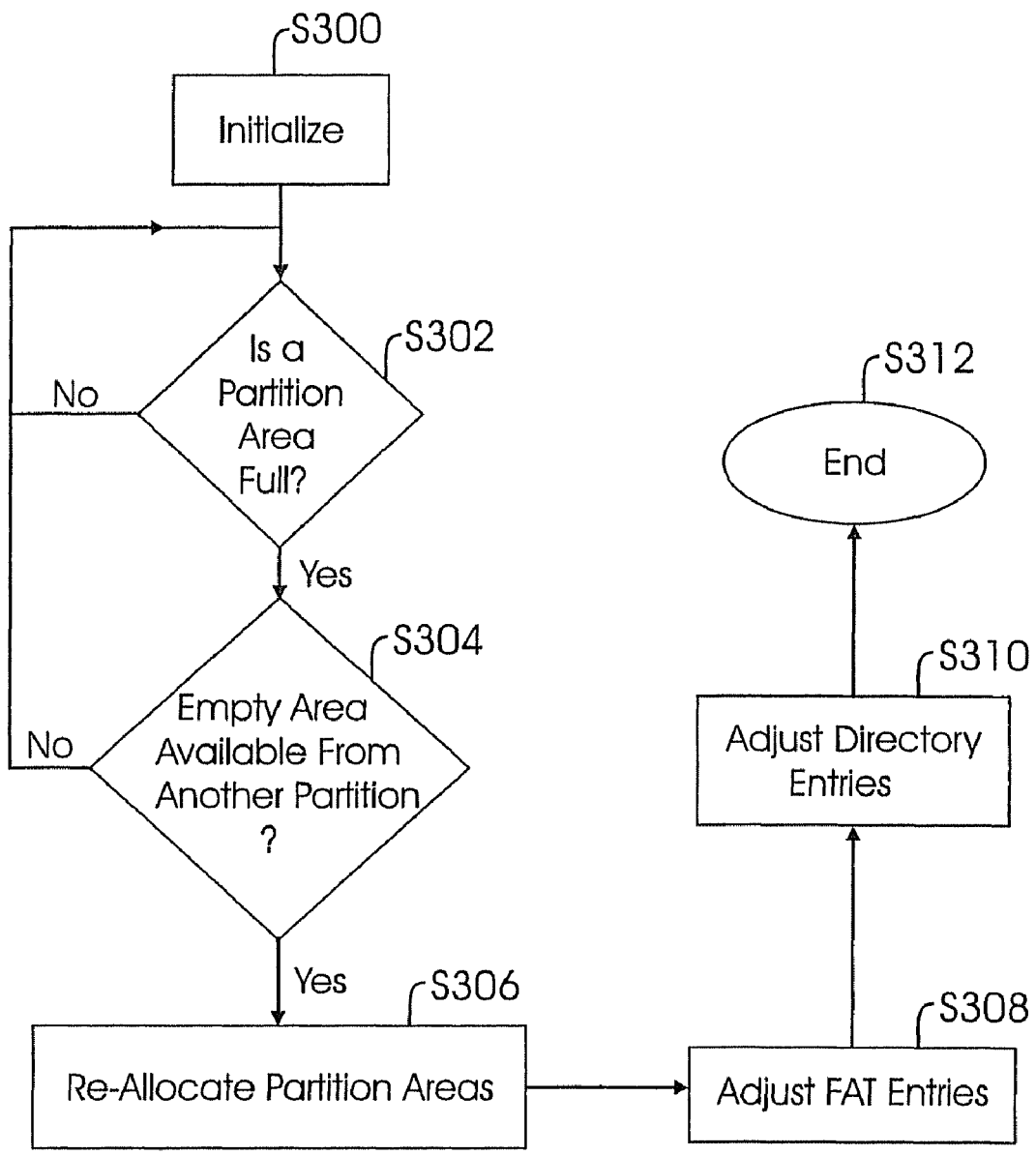
FIG. 3 shows an overall process flow diagram for re-allocating memory space in a mass storage device, according to one aspect of the present disclosure.

FIG. 3 shows a top-level flow diagram for re-allocating partition sizes, according to one aspect of the present disclosure. The process begins in step S300, when flash device 150 is initialized.

In step S302, controller 150A determines if a partition is full. A partition is considered full when it can no longer store any more data or it has reached a certain threshold programmable value. If a partition is not full, then controller 150A waits until a partition is full.

If a partition is full (for example, Partition 1 in FIG. 2A), then in step S304, controller 150A determines if empty space is available from another partition (for example, Partition 2). If empty space is not available, then the process returns to step S302.

If empty space is available, then in step S306, a certain amount of that empty space (for example, 202A) is allocated to the full partition. After the re-allocation, FAT entries for both the partitions are adjusted in step S308, as described below in detail. The directory entries are also adjusted in step S310, also described below in detail, and the process ends in step S312.

It is noteworthy that although the process flow above describes the memory partition re-allocation based on memory controller 150A detecting a "full partition", the present disclosure is not limited to that situation alone. For example, a host may send a specific command (for example, "Re-partition Drive") to controller 150A to re-partition the memory device, and the controller then performs the foregoing process steps to re-allocate memory space.

FIGS. 4A-4F illustrate the foregoing process steps for re-allocating memory space between at least two memory partitions. It is noteworthy that the various values that are used in FIGS. 4A-4F are simply used as examples for illustration purposes only and are not intended to limit the adaptive aspects of the present disclosure.

The example in FIGS. 4A-4F assumes that the cluster size in flash device 150 is 32 Kilo Bytes (KB), hence a 120 megabytes (MB) flash device has 4096 clusters. Each system area (201 and 203) uses 6 clusters and each partition has a data area of 2042 clusters. Each cluster may be referred to as a block, i.e., one block size is equal to the cluster size.

FIG. 4A shows a table for the initial partition state (as shown in FIG. 2A). Each partition has 6 blocks for system area and 2042 blocks for data area.

For Partition 1 system area 201 is assigned block numbers 0-5 and data area 202 are assigned block numbers 6-2047. When the file system writes to the first data cluster of Partition 1, it sends write operation to Logical Block Address 192 (where 192=6*32), i.e. block 6.

For Partition 2, system area 203 is assigned blocks 2048-2053 and data area 204 is assigned block numbers 2054-4095.

FIG. 4B shows an example of a mapping table 400A with virtual block numbers in row 400 and real block numbers in row 401. Column entries 402-409 are self explanatory and provide virtual and real logical block numbers for the system areas, data areas that are used and empty data areas.

At the initial stage (FIG. 2A and FIG. 4A), virtual block number and real logical block numbers are the same and contiguous. As shown in FIG. 4B, all entries in column 402-409 are the same for both the virtual and real logical block numbers.

FIG. 4C shows an updated mapping table 400B. The host system view (FIG. 2C) is shown in row 400 and the real logical memory space view (FIG. 2D) is shown in row 401.

The system area entries (shown in column 410) for Partition 1 in row 400 and 401 are the same. Column 411 shows that Partition 1 is full, i.e. all block 6-2047 are used. Partition 2 has some empty blocks (shown as 3001-4000 in FIG. 4B) and 500 of those empty blocks are allocated to Partition 1. The host sees these 500 blocks for Partition 1 to be from 2048-2547, as shown in row 400 and column 414, based on the virtual block number. Hence, for a host system, Partition 1 extends from block 0 to 2547. In real Logical memory space as shown in FIG. 2D, the 500 blocks for Partition 1 are located at block numbers 3001 and 3500 (as shown in row 401 and column 414, FIG. 4C).

Regarding Partition 2, the host sees the system area for partition area to be contiguous, i.e., from 2548-2553 (shown in row 400 and column 412), when in reality, the system area is from 2048-2053 (see row 401 and column 412).

The data blocks for the space used in Partition 2 are shown in column 413. Here again, the virtual block numbers are 2554-3500, while the real block numbers are from 2054-3000 (shown in row 401 and column 413). The entries for rows 400 and 401 and columns 415 and 416 are the same.

As shown by the foregoing example, the host does not copy data for re-allocating the partition space. By using and updating the mapping table 400A, unused space is re-allocated to the full memory partition.

Based on the foregoing example (FIGS. 4A-4C), the FAT table for Partition 1 is not changed. For Partition 2, the FAT entries are adjusted to accommodate the area that is assigned to Partition 1. Referring to the example in FIG. 2D, data area B for Partition 2 (shown as 204C) will have its entries reduced by the data area that is assigned to Partition 1. For example, if there are 500 entries of FAT in the new data area 202A, then the starting cluster for each file name entry in data area B for Partition 2 (shown as 204C) will be adjusted by 500, if it is below data area A of Partition 2 (shown as 204B).

FIG. 4D illustrates the foregoing example in a table format. Data area A for partition B (shown as 204B in FIG. 2D) has 1000 entries. Area 202A has 500 entries and area 204C has 500 entries.

In one implementation, each partition of flash device 150 publishes itself to the host to have certain capacity that is available for the partition. For example, if the flash device 150 is 4 GB, then each partition publishes itself to be 2 GB. Hence, it is desirable to have enough FAT area available for each partition so that it can accommodate the entire flash device space. This extra FAT table space allows the partition to grow. Hence, under memory controller 150A, FAT 1 area 207 and FAT 2 area 208 are big enough to contain FAT entries for the entire flash memory device capacity.

FIG. 4E shows a table with column 417 showing a host/user's view of a partition map and column 418 shows the actual/real partition map. As shown under column 418, the real partition map includes a reserved area 207A for FAT area expansion. This area is big enough so that the FAT entries in FAT 1 and FAT 2 can accommodate the entire storage device. When a partition expands (for example, Partition 1 in the foregoing example), the reserved area 207A is used to provide the extra space for the expansion. When the partition areas are re-allocated by memory controller 150A, the FAT areas are adjusted to accommodate the change in partition size.

Besides the FAT entries/area, the file name entries in the directory area are also adjusted (step S310, FIG. 3) when the partition spaces are re-allocated by memory controller 150A. Based on the foregoing example (FIGS. 4A-4C), the file name entry for Partition 1 is not changed. For Partition 2, the starting cluster for the file name entry is adjusted to accommodate the area that is assigned to Partition 1.

Referring to the example in FIG. 2D, data area B for Partition 2 (shown as 204C) will have its entries reduced by the data area that is assigned to Partition 1. For example, if there are 500 entries of FAT in the new data area 202A, then the starting cluster for each file name entry in data area B for Partition 2 (shown as 204C) will be adjusted by 500, if it is below data area A of Partition 2 (shown as 204B).

FIG. 4F illustrates the foregoing example in a table format. Data area A for partition B (shown as 204B in FIG. 2D) has 1000 entries. Area 202A has 500 entries and area 204C has 500 entries.

The starting cluster of each file name entry for new partition area 2 (=n) is adjusted by 500 if it is located beyond block 1000. Hence, if n>=1000, then n' (the adjusted file name entry) is equal to n−500. This adjustment is performed for all entries including those in areas 204B and 204C. If a file name entry shows that it is a directory or a sub-directory, then the directory (or sub-directory) entries are also adjusted.

In one aspect of the present disclosure, partition areas are re-allocated/adjusted by the memory device controller without copying all the data in a tedious time consuming operation. The host system does not have to perform the time consuming process of copying/re-formatting the drives in order to re-allocate partition storage space.

Although the present disclosure has been described with reference to specific embodiments, these embodiments are illustrative only and not limiting. For example, although the foregoing illustrations are based on flash memory devices, they are equally applicable to other type of memory devices, for example, a hard disk. Many other applications and embodiments of the present disclosure will be apparent in light of this disclosure and the following claims.

What is claimed is:

1. A method for dynamically re-allocating data storage space in a mass storage device, the method comprising:
performing, by a controller embedded within the mass storage device that has a memory space divided into partitions, which partitions include at least a first memory partition and a second memory partition:
determining when the first memory partition is full or has reached a threshold value;
determining that the second memory partition has unused storage space which can be allocated to the first memory partition when it is full or has reached a threshold value; and
assigning the unused storage space from the second memory partition to the first memory partition,
wherein the first memory partition includes storage space for storing a first File Allocation Table (FAT) and the second memory partition includes storage space for storing a second FAT, wherein the first FAT is expanded or shrunk based on whether storage space is being added to or removed from the first memory partition and the second FAT is expanded or shrunk based on whether storage space is being added to or removed from the second memory partition.

2. The method of claim 1, wherein the mass storage device includes re-programmable non-volatile memory cells, the memory cells being arranged in a plurality of blocks of memory cells that are erasable together and that are connected together in a plurality of series strings to define rows of memory cells for storing data.

3. The method of claim 1, wherein, when the mass storage device is connected via an interface to an external host, the method comprises further performing by the controller:
receiving data via the interface from the external host; and
reallocating the unused storage space from the second memory partition to the first memory partition using a mapping table that has a first virtual block address for the first memory partition and a first virtual block address for the second memory partition, wherein the storage space reallocated from the second partition to the first partition appears contiguous to the external host.

4. The method of claim 3, wherein when the mass storage device is initialized, the first virtual block address of the first memory partition and a corresponding real logical address of the first memory partition are the same and the first virtual block address of the second memory partition and a corresponding real logical address of the second memory partition are the same.

5. The method of claim 1, wherein the FAT for the first memory partition and the FAT for the second memory partition are large enough to accommodate FAT entries for the entire mass storage device.

6. The method of claim 1, wherein entries in the FAT for the first memory partition and entries for the FAT for the second memory partition are adjusted when the unused storage space is re-allocated.

7. The method of claim 1, wherein a file name entry in a directory is adjusted when the unused storage space is allocated from the second memory partition to the first memory partition.

8. The method of claim 1, wherein the mass storage device is one of a flash device and a magnetic hard disk.

9. The method of claim 1, wherein the controller re-allocates the unused storage space after receiving a command from an external host, and wherein the storage space assigned from the second partition to the first partition appears contiguous to the external host.

10. A method comprising:
in a mass storage device with a memory controller and non-volatile memory cells, the mass storage device including a first memory partition and a second memory partition, performing by the controller:
when the mass storage device is connected via a logical interface to an external host, receiving data via the logical interface from the external host; and
re-allocating memory storage space from the first memory partition to the second memory partition by using a mapping table, wherein the mapping table includes a logical block address and a virtual block address for each of the first memory partition and the second memory partition, and wherein the memory storage space re-allocated from the first memory partition to the second memory partition appears contiguous to the external host,
wherein the first memory partition includes storage space for storing a first File Allocation Table (FAT) and the second memory partition includes storage space for storing a second FAT, wherein the first FAT is expanded or shrunk based on whether storage space is being added to or removed from the first memory partition and the second FAT is expanded or shrunk based on whether storage space is being added to or removed from the second memory partition.

11. The method of claim 10, wherein the external host comprises one of a computer, a telephone, a personal digital assistant (PDA), a digital still camera, a digital movie camera, and a portable audio player.

12. The method of claim 10, wherein the mass storage device is a flash memory device.

13. The method of claim 12, wherein the flash memory device includes one of a CompactFlash (CF) card, a MultiMediaCard (MMC) card, a Secure Digital (SD) card, a miniSD card, a Memory Stick card, and a TransFlash card.

14. The method of claim 10, wherein the logical interface comprises a universal serial bus (USB) interface.

15. The method of claim 10, wherein the virtual block address and the logical block address of the first memory partition are the same before the memory storage space is re-allocated from the first memory partition to the second memory partition, and the virtual block address and the logical block address of the first memory partition are different after the memory storage space is re-allocated from the first memory partition to the second memory partition.

16. The method of claim 15, wherein the first memory partition includes a first set of non-volatile memory cells, and the second memory partition includes a second set of non-volatile memory cells.

17. A flash memory device, comprising:
a first memory partition including a first set of non-volatile memory cells;
a second memory partition including a second set of non-volatile memory cells;
a mapping table including a logical block address and a virtual block address for each of the first memory partition and the second memory partition;
an interface adapted to connect to a host device and, when connected to the host device, to receive data from the host device; and
a memory controller;
wherein the memory controller is adapted to re-allocate memory storage space from the first memory partition to the second memory partition using the mapping table, wherein the memory storage space re-allocated from the first memory partition to the second memory partition appears contiguous to the host device;
wherein the virtual block address and the logical block address of the first memory partition are the same before the memory storage space is re-allocated from the first memory partition to the second memory partition, and the virtual block address and the logical block address of the first memory partition are different after the memory storage space is re-allocated from the first memory partition to the second memory partition; and
wherein the first memory partition includes storage space for storing a first File Allocation Table (FAT) and the second memory partition includes storage space for storing a second FAT, wherein the first FAT is expanded or shrunk based on whether storage space is being added to or removed from the first memory partition and the second FAT is expanded or shrunk based on whether storage space is being added to or removed from the second memory partition.

18. The flash memory device of claim 17, wherein the flash memory device includes one of a CompactFlash (CF) card, a MultiMediaCard (MMC) card, a Secure Digital (SD) card, a miniSD card, a Memory Stick card, and a TransFlash card.

19. The flash memory device of claim 17, wherein a file name entry in a directory is adjusted when the memory storage space is re-allocated from the first memory partition to the second memory partition.

* * * * *